Feb. 7, 1939. H. SCHICHT 2,146,232
HOB
Original Filed Dec. 17, 1930 5 Sheets-Sheet 1

Inventor:
Heinrich Schicht
By
Attorneys

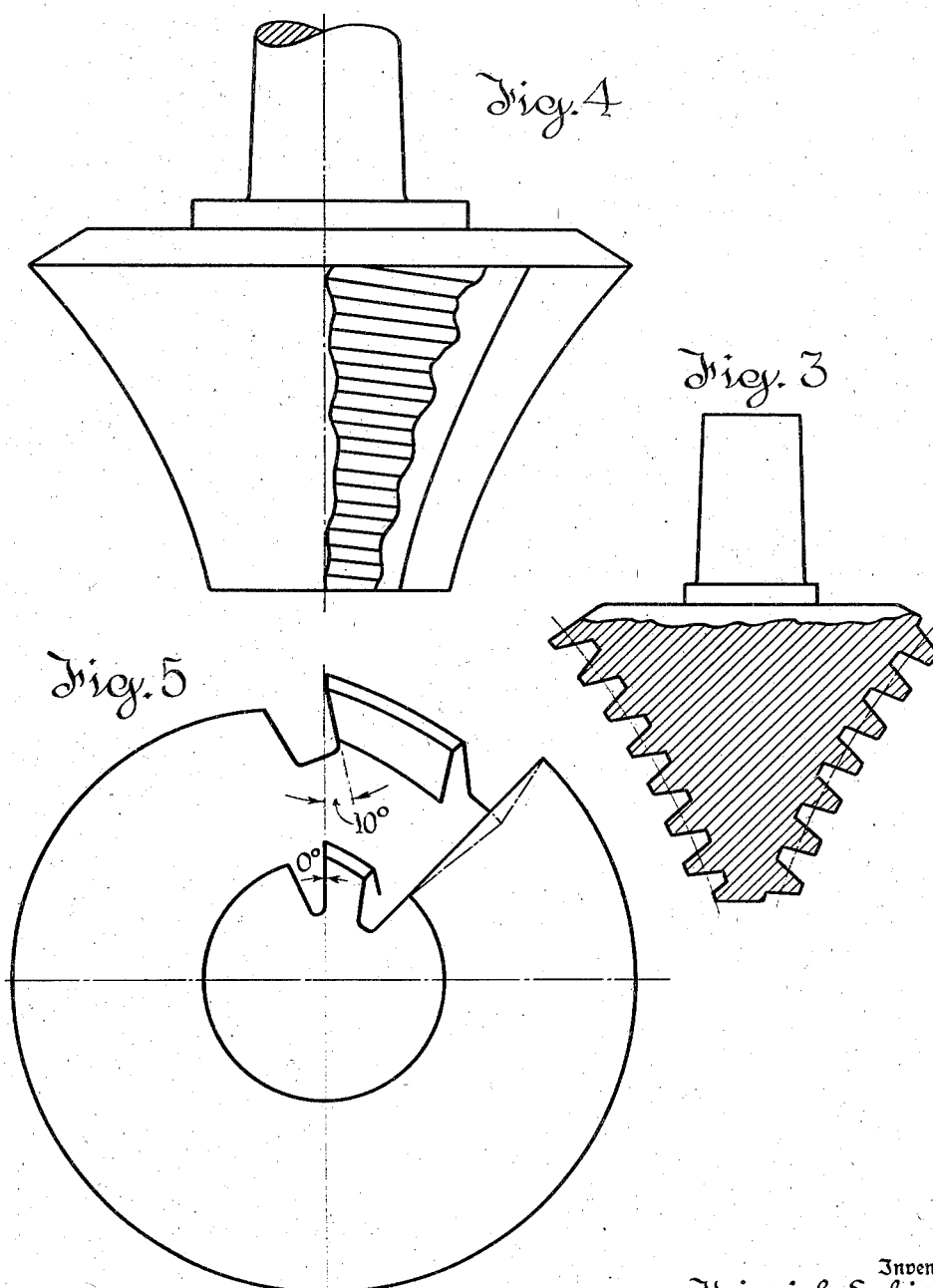

Feb. 7, 1939. H. SCHICHT 2,146,232
HOB
Original Filed Dec. 17, 1930 5 Sheets-Sheet 3

Inventor:
Heinrich Schicht
By [signature]
Attorneys

Feb. 7, 1939.  H. SCHICHT  2,146,232
HOB
Original Filed Dec. 17, 1930  5 Sheets-Sheet 4

Inventor:
Heinrich Schicht,
By Dodge and Sons,
Attorneys

Feb. 7, 1939.   H. SCHICHT   2,146,232
HOB
Original Filed Dec. 17, 1930   5 Sheets-Sheet 5

Inventor:
Heinrich Schicht,
By
Attorneys

Patented Feb. 7, 1939

2,146,232

UNITED STATES PATENT OFFICE 2,146,232

HOB

Heinrich Schicht, Huckeswagen, Germany, assignor to the firm W. Ferd Klingelnberg Söhne, Remscheid-Berghausen, Germany Original application December 17, 1930, Serial No. 503,081. Divided and this application September 19, 1935, Serial No. 41,330. In Germany December 21, 1929

4 Claims. (Cl. 29—103)

This invention relates to a hob or cutter for shaping bevel gears, and particularly for shaping spiral bevel gears having teeth of approximately uniform height throughout their length, and a curvature which renders the gears practically insensitive to axis displacements.

The distinctive feature of the gears is that the tooth spaces, while of equal width at the major and minor diameters of a gear, are not of uniform width throughout their length. On the contrary, the teeth are formed with a sharper curvature on their convex than on their concave sides, so that the convex sides are crowned or bulged. Consequently, meshing contact between gears of this type occurs in general only along the intermediate portions of the teeth, and slight displacements of the axes of the gears produce substantially no change in the area of tooth contact. Gear teeth shaped by a hob according to this invention have a form which may be appropriately designated a "Palloid" curve, this name being taken from the Greek word "pallein" meaning to swing, and hence describing the property of the gears being insensitive to angular displacements of their axes.

The object of the invention is a hob or cutter which may be used in a hobbing machine to produce gears of the type above mentioned, and adapted either for intersecting or offset axes. A hob of this type may appropriately be used in a machine of the type disclosed in my application Serial Number 503,081, filed Dec. 17, 1930, now Patent No. 2,037,930 of which the present case is a division.

The invention will be more fully understood when the following specification is read in conjunction with the drawings in which:

Fig. 3 is an axial section of one form of hob embodying this invention.

Fig. 4 is a side elevation of the hob of Fig. 3 showing a single row of teeth with the cutting faces undercut.

Fig. 5 is an end view of Fig. 4 showing the details of the undercut teeth.

Figs. 11 to 14 inclusive are diagrammatic views showing the steps performed by a single hob or cutter tooth in generating the tooth profile.

Bevel gears shaped according to this invention may be conveniently cut by a continuous rolling, milling, or hobbing process carried out by a single hob which simultaneously shapes the convex and concave tooth curves in a single operation. This process is of such a character that it becomes possible to so form the teeth of the gears that displacement of the gear axes may occur without causing the gear teeth to wedge or to work noisily, and this is brought about by maintaining a large contact zone for the intermeshing teeth.

Figure 2:
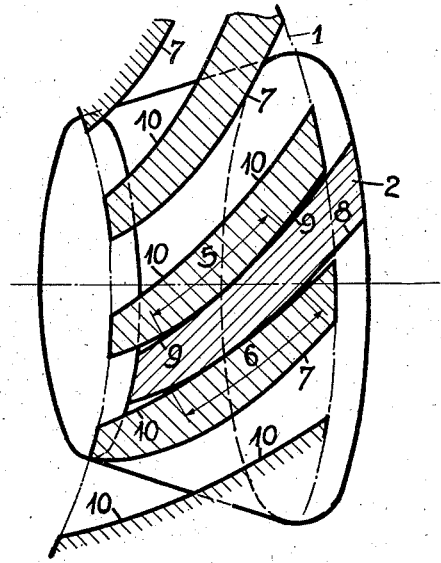
Fig. 2 is a section similar to Fig. 1 showing the pinion tooth displaced from the correct position of Fig. 1.
Figure 1:
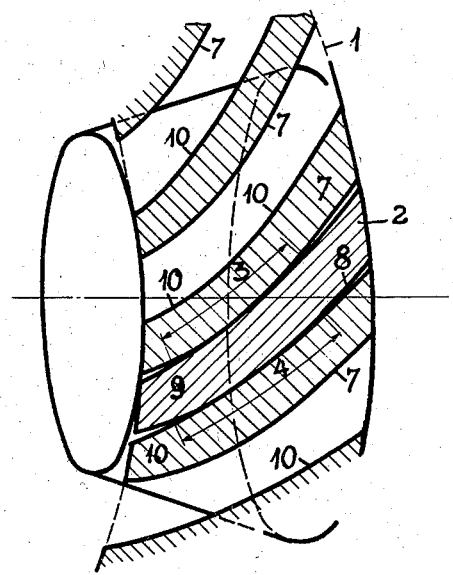
Figure 1 is a partly developed section of a face gear and a pinion tooth, the pinion tooth being shown in the correct position with respect to the face gear.

Before describing the structure of the hob, reference may be had to Figs. 1 and 2 of the drawings in which the reference character 1 designates a face gear, and 2 a pinion tooth which is meshing with the teeth of the face gear. In Fig. 1, the flanks 7 and 9 of the gear and pinion make contact with each other within the zone designated by the arrow and the character 3 for one direction of drive. The flanks 8 and 10 contact with each other within the zone 4 during drive in the opposite direction. By shifting the pinion to the position shown in Fig. 2, the tooth contact is displaced to one of the zones 5 or 6 without producing a noisy point contact at either the outer or the inner edges of the teeth. Hence, the teeth are within certain limits indifferent to relative axial displacements of the gears.

With the type of tooth curve described it is possible to have the zone of flank contact in a central position, or more towards one or the other end, as desired, the selected position being obtained by means of cutter adjustment as will be described. Generally, however, it is desirable to have the center of contact at the center of the tooth so that under normal conditions the tooth is uniformly stressed in the central position, the flank contact being able to shift through approximately equal distances towards either end if one of the gears is pushed further in or partly withdrawn.

The bevel gears preferably used in practice have a large degree of tooth overlap but nevertheless small axial pressures. In this direction, too, the invention has an important feature, since owing to the adjustment of the cutter relative to the basic face gear a curve is generated, which has a very small initial spiral angle, and thus permits of cutting a large width of tooth compared with the face gear radius, while still having the advantage of small axial pressure and a high degree of insensitiveness.

By making the spiral angle at the smallest diameter as small as possible, an additional advantage is gained, namely an increase of insensitiveness of the gears, since that part of the Palloid curve is obtained which changes its curvatures most quickly from the small to the large diameter of the gear. Hence, the generated tooth curves of the driving and driven gears fit into each other perfectly, forming a large contact zone with a margin for wandering in case of axis displacement.

The hob cutter shown in Fig. 3 may have a single screw thread or a plurality of screw threads, the pitch surface line on which the pitch is measured being concave. Inasmuch as, generally speaking, the top and root portions of the gears are not in engagement, the shape of the top and root portions of the hob cutter are of secondary importance. For convenience of manufacture the hob teeth are generally of equal depth, and normally use is made of a hob, the top and root lines of which are concave, the hob surface being a curvilinear surface of revolution generated by a concave line.

The thickness of the cutter teeth measured either on the curved pitch line or on the chord, varies from end to end, being equal at the large and small diameters, but decreasing towards the center of the surface line. Viewed from the small diameter, the pitch of the concave flank increases towards the center of the surface line, whence it decreases again towards the large diameter. On the convex tooth flank of the cutter the pitch decreases towards the center of the surface line and thence increases towards the large diameter.

The hob cutter is shaped by a special backing-off process the normal backing-off movement of the tool (turning tool, milling cutter or grinding wheel or finger) being combined with a radial movement controlled by a cam and change gears. The additional movement is directed radially towards the axis of the cutter, and the tool is advanced towards this axis in the course of its travel from one end of the cutter to the point midway between the ends. From this point to the opposite end, the tool is moved away from the axis of the cutter, thereby following the concavity of the cutter surface. The control cam surface may conform to an arc, parabola, sinoidal curve or in any other desired curvature.

The hob designated 11 is shown in Fig. 3 of the drawings, and it will be observed that the separate rows of teeth follow a concave surface line which is oblique to the axis of the hob.

Figure 6:
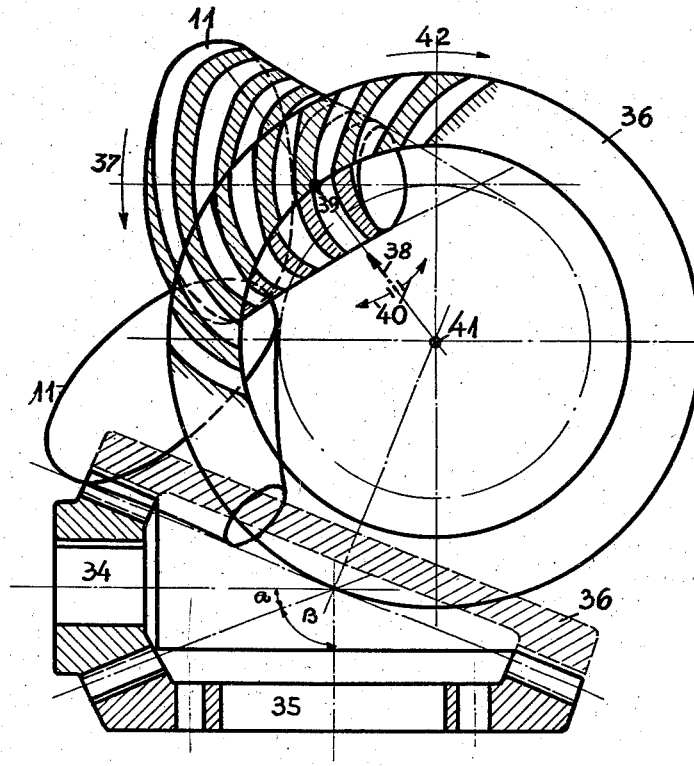
Fig. 6 is a diagrammatic view showing the relative position of the imaginary face gear and a pair of intermeshing bevel gears, and also showing the position of the hob relative to the imaginary face gear.
Figure 9:
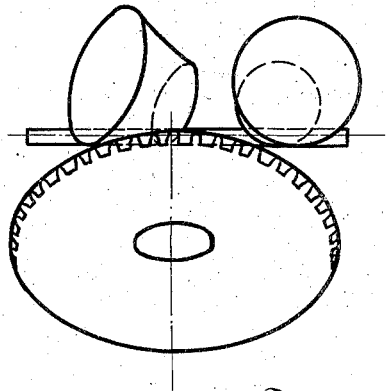
Fig. 9 is a perspective view showing the hob in beginning and finishing positions relative to the gear flank and also showing the imaginary face gear.
Figure 11:
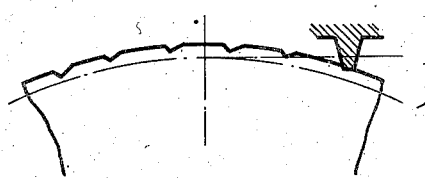
Figure 12:
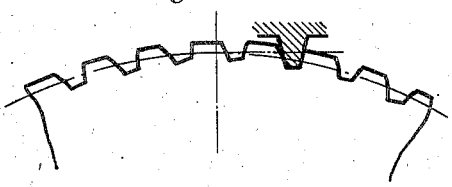
Figure 13:
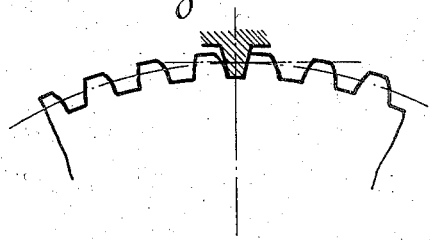
Figure 14:
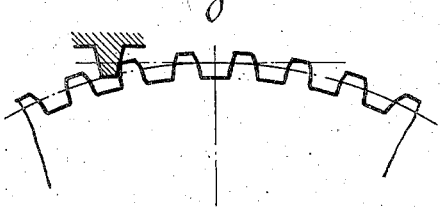

The hob cutter 11 described serves for generating the improved tooth system. By suitably mounting the cutter on a face plate of the hobber rotating about its axis, it is able to perform or effect the following movements (see Figs. 6, 9 and 10):

1. Rotation of the cutter about its axis in the direction of the arrow 37, the number of revolutions being $n_f$.

2. Rotation of the face gear, due to the cutter rotation, in the direction of the arrow 42, the number of revolutions being $n_{p1}$.

(With the cutter having $Z_f$ threads and the face gear having $Z_{p1}$ teeth the ratio may be represented as follows:

$$N_f : n_{p1} = Z_{p1} : Z_f)$$

3. Radial adjustment of the cutter with reference to the face plate center 41 in the direction of the arrow 38, to regulate the distance of the cutter from the center 41 of the face plate.

4. Rocking of the cutter through an angle of $90° - (\tau \pm \gamma)$ (Fig. 8) to the radius line of the face plate about the point 39, in the direction of the arrow 40.

Figure 8:
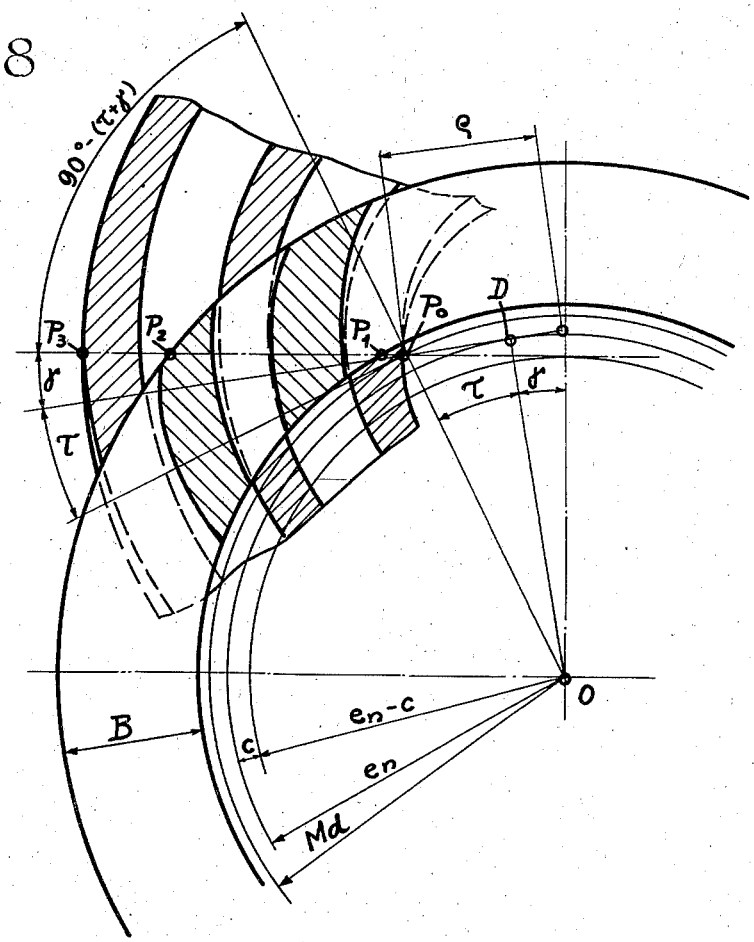
Fig. 8 is a plan view of Fig. 7 showing a portion of the hob outline developed.

With the adjustments mentioned under 3 and 4, it is possible to adjust the surface line of the cutter tangentially to a circle concentric to the face plate center with the radius R, Fig. 8.

5. Rotation of the face plate together with the cutter about the center 41 of the face plate and basic face gear 36.

The purpose of this rotation is to move the cutter in the track of the basic face gear around the point 41 (Fig. 6), with the cutter teeth gradually cutting into the blank, producing the gear teeth to their full depth in a single operation and during one pass (see Figs. 11 to 14 inclusive).

6. Rock motion of the cutter about an axis 52.

This motion is necessary to permit cutters with various angles $\epsilon$ to be used in the hobber, and certain corrections to be conveniently made for producing the contact zone of the teeth in the desired position.

Figure 10:
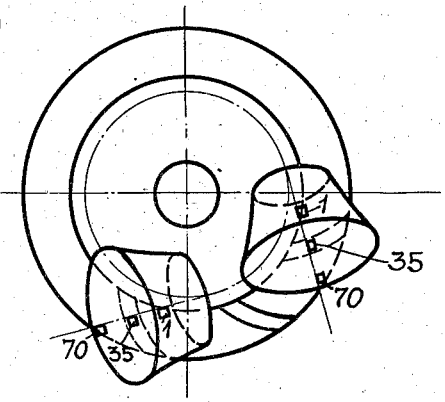
Fig. 10 is a plan view of the assembly of Fig. 9.

As already mentioned, the cutter represents in axial section a concave rack (Fig. 3), and the teeth of this rack are perpendicular to the chord of the arc defined by the root, top and pitch surface lines. The cutter is so positioned across the whole tooth width of the bevel gear that the mentioned rack extends over the whole width of tooth (Fig. 8). When the cutter and the blank rotate, the rack travels in the direction of the cutter axis, to the left or right according to the direction of the cutter lead. The teeth at one end of the cutter form the part of the rack at the inside diameter of the gear, and the teeth at the other end form the part of the rack at the outside diameter of the bevel gear. Hence, a small part of the tooth width of the bevel gear is apportioned to each cutter tooth (Fig. 10). In the case of a cutter having, for example, ten grinding flutes and seven teeth in each row, the first tooth being located at the inside diameter, and the last tooth at the outside diameter of the work, the width of the tooth is subdivided into seventy small parts, each machined by one cutter tooth. Since the rack is concave towards the outside, the pitch and root outline surfaces of the bevel gear will be curved, the curves being convex towards the outside. The teeth of the bevel gears having pitch outline surfaces convex towards the outside are consequently slightly thicker in the central portions than at the ends, so that the tooth flanks do not make contact over the whole length of the teeth. Normally, the contact zone of two meshing tooth flanks extends from the center of the tooth in both directions.

Figure 7:
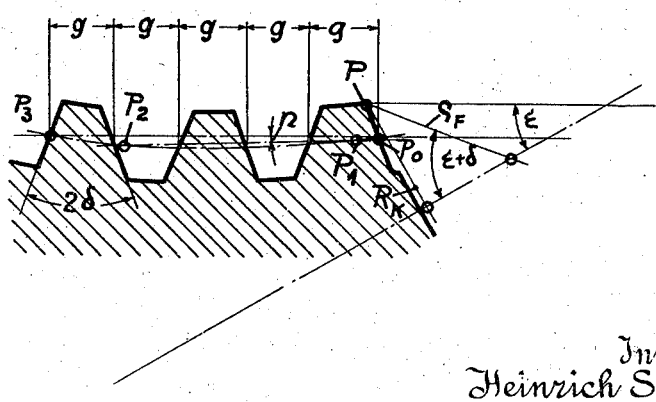
Fig. 7 is a diagrammatic view showing the relative adjustment between the hob and the basic face gear.

It is, however, not always necessary to have the contact zone at the central portion of the tooth. With a given curvature of the cutter surface line, position of the contact zone may be regulated by adjusting the cutter. In this connection the following considerations must be borne in mind:

The width of tooth B to be cut determines the length of the operative cutting part of the cutter, and this effective length of the cutter, in turn, determines the adjustment of the cutter. For example, if a gear having teeth of the width B is to be cut (Fig. 8) the total cutter length $P_0$—$P_3$ will not be effective in cutting, but only the length having the chord $P_1$—$P_2$. This chord must be adjusted to the plane of the basic face gear, and must accordingly be swung through the angle $\eta$ (Fig. 7). By changing the angle $\eta$ it is possible to transfer the contact zone from the central portion of the tooth to the larger or smaller base of the gear.

As already mentioned, it is desirable in connection with bevel gears having inclined or curved teeth to have the highest possible degree of overlapping, together with the minimum axial pressure. These two requirements are, however, incompatible with each other, and generally one can only be obtained at the expense of the other. With this process, therefore, it is of great importance to have means for adjusting the cutter on the hobber in such a way, that a curved tooth is produced having at its inside diameter a very small spiral angle, which increases comparatively quickly towards the large diameter, in order to obtain adequate overlap.

An additional advantage of the small spiral angle at the small diameter lies in the fact that in case of axial displacement of the pinion the difference between the disengagement of the flank portions at the inner and outer ends of the tooth is more pronounced than with a larger spiral angle, so that by means of slight axial displacement of the pinion, the gears may be easily adjusted to produce the most efficient mesh when assembling them. To obtain this minimum of spiral angle, the cutter is so adjusted on the hobber that its surface line lies in the plane of the basic face gear. Since the surface line of the cutter is curved, the basic face gear also has a curved pitch surface.

Furthermore, the cutter is so adjusted relative to the face gear that the first complete tooth at the small cutter diameter is radially distanced by an amount $M_d$ from the center point of the face gear, and the chord of the concave pitch surface line in its extension is tangent to a circle with the radius R about the center point of the face gear, this circle being smaller than the normal pitch circle of the face gear with the radius $e_n = \frac{1}{2} Z_{p1}.M_n$. The normal to the direction of lead at the first complete cutter tooth, then, is tangent to the said normal pitch circle of the face gear. In the above equation, $Z_{p1}$ designates the number of teeth of the face gear, and $M_n$ the module of that cutter lead which corresponds to the first complete tooth at the small diameter, since the cutter has non-uniform lead. The radius R is found from the relation $$R = M_d . \cos(\tau + \gamma)$$

The calculation of the distance $M_d$ may be derived from the Figures 7 and 8. The radius of curvature $\rho$ of the concave tooth curve at the point $P_0$, Fig. 8, of the small gear diameter must be equal to or larger than the radius of curvature $\rho_F$ of the convex cutter tooth flank of the first solid tooth at the small cutter diameter at the point P, the latter radius being determined from $$\rho_F = \frac{R_k}{\sin(\epsilon + \delta)} \leq \rho$$

where $\epsilon$ is the angle formed by the chord of the concave cutter surface line and the cutter axis $\delta$ is the half flank angle of the cutter tooth.

To obtain the smallest spiral angle at the small diameter of the gear, it must be $$\rho = \rho_F$$

Hence, the distance $M_d$ is expressed by $$M_d = \sqrt{e_n^2 + (\rho_F - e_n . tg\gamma)^2}$$

$\gamma$ being the lead angle of the cutter tooth spiral at the point P (Fig. 7).

The angle of setting $\tau$ results from $$\cos \tau = \frac{e_n}{M_d} = \frac{\frac{1}{2} Z_{p1}.M_n}{M_d}$$

This adjustment of the cutter is of great importance. With this adjustment, the smallest radius of curvature of the convex cutter tooth flank of the first complete tooth at the smallest cutter diameter answers its purpose prefectly.

To hob a right hand spiral gear, a left handed cutter is preferably used, and vice versa, a left hand spiral gear being preferably cut by a right handed cutter.

The cutters described also have the feature of forming the teeth so that the grinding of the flanks, after the hardening process, can be facilitated by providing a surplus of material at the roots and tops of the teeth, where the teeth are subjected to the greatest abrasive action. To this end, the cutter flank for shaping the driving gear flank is given a smaller pressure angle than the cutter flank for shaping the driven gear flank.

The teeth at the larger diameter of the cutter perform the principal roughing cuts, and since, with the teeth coming nearer to the smaller diameter, the radius of action of the teeth becomes smaller, the share of roughing work allocated to each tooth gradually becomes smaller and smaller, so that the cutting teeth in the first screw thread at the smaller end of the cutter only perform finishing cuts, the preceding teeth, owing to their larger radius of action, performing the roughing work for the cutter teeth in the subsequent screw threads towards the smaller end. In order that the cutting capacity of the teeth located towards the larger end may be as large as possible, in accordance with the increasing roughing work to be performed by them, the teeth have an undercut face angle instead of a radial cutting face, this undercut face angle having the smallest value at the small diameter and gradually increasing towards the large diameter, until attaining a maximum value. Thus, the undercut face angle may for example amount to 10° at the large diameter and to 0° at the small diameter. The limiting values depend on the material to be hobbed (see Fig. 5). This variability of the undercut face angle is provided for by making use of a special grinding machine, the grinding wheel of which, controlled by a template, is inclined at a variable angle with respect to the radial line of cutter. The swinging axis of the wheel exactly coincides with the top line of the cutter teeth. This mechanism is described in the above mentioned application.

It will be apparent from the foregoing description, that hobs made according to this invention are made up of a series of separated rows of teeth, each row of teeth in axial section showing an outwardly concave pitch line. The separate teeth are not perpendicular to this pitch line but rather to a chord drawn to connect the ends of this line. Hence, the teeth are parallel and can be used in cutting gear teeth having "Palloid" curves, without wedging action, and a single hob may suffice for cutting gears of different diameter. Furthermore, sharpening of the hob is a relatively simple matter and the hob may be used to generate gears not only on machines of the type described in the above mentioned parent application but in various machines of conventional type.

What is claimed is:—

1. A hob for shaping spiral bevel gears, comprising a conical body having a series of axial rows of cutting teeth formed therein, the cutting faces of the teeth being undercut by amounts which decrease from the large to the small diameter end, the extreme cutting edges of all of the teeth of each row being located in a common plane passing through the hob axis.

2. A universal hob for shaping either a driving or a driven palloid bevel gear, comprising a conical tapered body having a plurality of rows of cutting teeth formed thereon with concave operating pitch lines, both flanks of each tooth being designed as cutting flanks, one set of tooth flanks having a smaller pressure angle than the other set of flanks.

3. A taper hob for shaping palloid spiral bevel gears, comprising a tapered body having a series of axial rows of cutting teeth formed thereon, the operating pitch line of the teeth in each of said rows being arcuate and outwardly concave.

4. A hob for shaping spiral bevel gears, comprising a conical body having a series of axial rows of cutting teeth formed thereon each of said rows of teeth having an outwardly concave operating pitch surface, the cutting faces of the teeth being undercut by amounts which decrease from the large to the small diameter end, the extreme cutting edges of all of the teeth of each row being located in a common plane passing through the hob axis.

HEINRICH SCHICHT.